(12) United States Patent
Voellmecke et al.

(10) Patent No.: US 8,919,295 B2
(45) Date of Patent: Dec. 30, 2014

(54) COLLAR FOR DOGS AND OTHER ANIMALS

(75) Inventors: Valentin Voellmecke, Iserlohn (DE);
Dirk Schulte, Iserlohn (DE)

(73) Assignee: Herm Sprenger GmbH & Co. KG,
Iserlohn (DE)

( * ) Notice: Subject to any disclaimer, the term of this patent is extended or adjusted under 35 U.S.C. 154(b) by 0 days.

(21) Appl. No.: 12/983,812

(22) Filed: Jan. 3, 2011

(65) Prior Publication Data
US 2011/0162590 A1    Jul. 7, 2011

Related U.S. Application Data

(63) Continuation of application No. PCT/EP2009/055571, filed on May 7, 2009.

(30) Foreign Application Priority Data

Jul. 3, 2008   (DE) .......................... 10 2008 031 229

(51) Int. Cl.
*A01K 27/00* (2006.01)

(52) U.S. Cl.
USPC ............ 119/856; 119/862; 119/864; 119/863

(58) Field of Classification Search
USPC .......................... 119/856, 862, 864, 863, 792
See application file for complete search history.

(56) References Cited

U.S. PATENT DOCUMENTS

| | | | | |
|---|---|---|---|---|
| 448,546 A | * | 3/1891 | Sagelsdorff | 119/863 |
| D21,344 S | * | 2/1892 | Bryant | D30/152 |
| 485,630 A | * | 11/1892 | Hull | 119/855 |
| 1,170,767 A | * | 2/1916 | Lott | 59/80 |
| 1,328,019 A | * | 1/1920 | Stewart | 40/665 |
| 1,472,805 A | * | 11/1923 | Mentzer | 152/241 |
| 1,558,068 A | * | 10/1925 | Weeks | 59/84 |
| 1,558,490 A | * | 10/1925 | Mayberry | 198/702 |
| 1,827,243 A | * | 10/1931 | Kuehner | 24/71 J |
| 1,866,993 A | * | 7/1932 | Benner | 474/227 |
| 2,743,702 A | * | 5/1956 | Sullivan | 119/864 |
| 2,821,034 A | * | 1/1958 | Baker | 40/300 |
| 2,880,701 A | * | 4/1959 | Foster | 119/858 |
| 2,924,198 A | * | 2/1960 | McMurray | 119/858 |
| 3,842,426 A | * | 10/1974 | Ratcliff et al. | 24/270 |
| 3,864,906 A | * | 2/1975 | Cullen | 59/84 |
| 3,995,598 A | * | 12/1976 | Gardner et al. | 119/864 |

(Continued)

FOREIGN PATENT DOCUMENTS

DE    33 44 699    6/1984

OTHER PUBLICATIONS

International Search Report for International Application No. PCT/EP2009/055571 mailed Jul. 23, 2009.

*Primary Examiner* — Isam Alsomiri
*Assistant Examiner* — Justin Benedik
(74) *Attorney, Agent, or Firm* — McCarter & English, LLP

(57) ABSTRACT

A collar for animals includes chain links produced from a sheet-metal blank and by bending the sheet-metal blank about bending lines. The chain links each have a hook portion and a hook-in portion. The hook-in portion includes a window dimensioned such that the hook portion fits through the window. The hook-in portion further has an edge portion located between the window and a rear end of the chain link. The sheet-metal blank includes a first end portion and an opposite second end portion, and the second end portion limits the edge portion.

19 Claims, 6 Drawing Sheets

(56) References Cited

U.S. PATENT DOCUMENTS

| | | | |
|---|---|---|---|
| 4,309,797 A * | 1/1982 | Schrougham et al. | 24/307 |
| 4,432,120 A * | 2/1984 | Sherman et al. | 24/299 |
| 5,647,303 A * | 7/1997 | Deioma | 119/864 |
| 6,606,967 B1 * | 8/2003 | Wolfe et al. | 119/856 |
| D482,826 S * | 11/2003 | Sasco | D30/152 |
| 6,938,580 B2 * | 9/2005 | Herbst | 119/864 |
| 2006/0179814 A1 * | 8/2006 | Galligani | 59/82 |

* cited by examiner

COLLAR FOR DOGS AND OTHER ANIMALS

CROSS-REFERENCE TO RELATED APPLICATIONS

This application is a continuation of International Patent Application No. PCT/EP2009/055571, filed May 7, 2009 and claims priority to German application No. DE 10 2008 031 229.0, filed Jul. 3, 2008. The contents of both of the applications is hereby incorporated by reference herein.

FIELD OF THE INVENTION

The present invention relates to a collar for animals, in particular for dogs, comprising chain links, wherein the chain links each have a hook portion and each a hook-in portion which can be fitted into one another. The chain link can, but does not have to, have at least one tooth protruding inwardly.

BACKGROUND OF THE INVENTION

A collar for animals is known from DE 84 15 418 U1 in which the individual chain links are made from round stock and are additionally encased, for example with leather. The free ends of each section of the round stock, from which one chain link, respectively, is bent, form two teeth. The lining is supposed to prevent the spiked collar from being recognized as such immediately.

The dog collar known from DE 9 41 458 A, which, however, comprises only two chain links that are bent from round stock and have two teeth each, uses similar chain links.

In the case of spiked collars, efforts are being taken to approximate the collar to a normal collar, as far as possible, in order for it not to be immediately recognized as a spiked collar. In this respect, spiked collars whose chain links are made from round stock are disadvantageous because they are clearly distinct from other collars. However, such collars have numerous advantages; they can be separated at any time between two chain links, they can be produced simply, they are very well protected against wear and tear and are easy to keep clean.

Based on the known collars, the invention has set itself the object of developing the known collars further in such a way that they make a good visual impression; in any case resemble a normal collar more closely than a typical collar, i.e. one that has been made of wire.

SUMMARY OF THE INVENTION

This object is achieved by a collar for animals, in particular for dogs, comprising chain links which are each produced from a sheet-metal blank and by bending this sheet-metal blank about bending lines, wherein the chain links each have a hook portion and each a hook-in portion, and wherein the hook-in portion comprises a window.

In this collar, the individual chain links are produced from a sheet-metal blank. The chain links are preferably produced from metal. The outward appearance of the collar is that of a link chain consisting of full-surface sheet-metal plates lying next to one another. It can virtually not be recognized as a spiked collar. The spikes can be disposed on the inside in such a concealed manner that they cannot be recognized immediately even if one looked behind the collar obliquely. It is also advantageous that the spikes can be configured independently from the geometry of the chain links and without regard to the function of the chain links. They are mere additions and could thus be omitted without the chain losing its purchase. Where the bent-wire spike collars according to the prior art, as they are generally prevalent, are concerned, this is not the case.

What is retained in this invention is the high wear-resistance of the pure metal chains. Cleaning is also convenient; the chain can be cleaned easily. Visually, the chain according to the invention is more attractive and beautiful than the collars according to the prior art.

Preferably, the window is dimensioned such that the hook portion fits through the window, and the hook-in portion moreover comprises an edge portion located between the window and the rear end of the chain link, and the hook portion has a free opening dimensioned such that the edge portion fits through the free opening.

In contrast to the collars made from wire, the chain links are not elastically deformed during dismantling and assembling; rather, joining and dismantling requires a complicated path similar to a chicane. This results in a lock by positive fit, and not an elastic lock, as is the case in the collars made from wire. However, this means that mishandling is largely precluded, that the individual chain links can be manufactured from a relatively solid material, and that the shape of the individual chain links does not change even over an extended period of time.

In order to separate and dismantle two adjacent chain links, the hook portion in each case has to be guided through the window. The hook portion has a complicated shape; in any case, it does not run in a straight line but is curved, mostly curved several times, for example, it extends in an S-shaped curve. This may also include the at least one tooth protruding transversely from the chain link. A complicated movement is thus required in order to separate or join the chain links. This movement is simple with regard to two adjacent chain links; however, in the normal sequence of movements it practically cannot occur since there is a certain tension in the chain if the chain is worn, and a spontaneous separation can be excluded in this case.

Preferably, the tooth area comprises two teeth that extend parallel to one another and are configured similar to a dog's teeth. The invention makes it possible to select any shape for the teeth. Thus, they can be shaped so as to have an optimum effect on the dog. They can be rounded off so as to cause practically no injuries.

It was found to be particularly preferred that the hook-in portion has an edge portion provided between the window of the hook-in portion and the adjacent end. This edge portion is bent at a certain angle relative to a rear main portion of the hook-in portion. The chain is thus rounded; the individual chain links are at the same angle relative to one another by which the edge portion is bent. The chain can thus be adapted to a certain diameter corresponding to the diameter of the neck of the dog, and in this case has its optimum effect.

The chain links can be very easily produced in each case from a sheet-metal blank. Metal-sheet material with typically 1 to 2 mm wall thickness is used; preferably, the wall thickness is in the range of from 1.5 mm plus/minus 10%. This leaves sufficient space for the relative movement of the chain links. The individual blanks are substantially elongate; on one end, they form a tooth, the window is at the other end. They are bent several times into their final shape along bending lines that extend parallel to the longitudinal direction of the window. Machines can be used for this purpose.

Preferably, the hook portion has an inner space of the hook; this inner space offers sufficient room for the edge portion. Preferably, the clear dimensions of the inner space are greater than 1.5 times the measured width of the window (measured transverse relative to the longitudinal direction of the window). In the configuration which is easy to dismantle and assemble, the inner space in the area of the free opening of the hook portion is narrow and widens towards the outside and towards the inside. This leaves enough space for joining. The free opening can be selected such that the edge portion, oriented obliquely, just fits through. This results in a good safeguard against spontaneous disengagement. In the configuration that cannot be dismantled or assembled, the free opening is so small, in particular zero, that the edge portion does not fit through the free opening without deformation.

It was found to be preferred to provide an intermediate link in the collar. It has no teeth. It can be positioned in the area of the larynx of the dog. This critical area is thus protected. The intermediate link is advantageous in that the chain links can be disposed on both sides in a minor-image arrangement, which simplifies the production of the collar and, in particular, simplifies the configuration of the final links. They can now be constructionally identical.

BRIEF DESCRIPTION OF THE DRAWINGS

Other advantages and features of the invention become apparent from the other claims as well as from the following description of three exemplary embodiments of the invention, which are to be understood not to be limiting and which will be explained below with reference to the drawing. In the drawings:

DETAILED DESCRIPTION OF THE DRAWINGS

Figure 7:
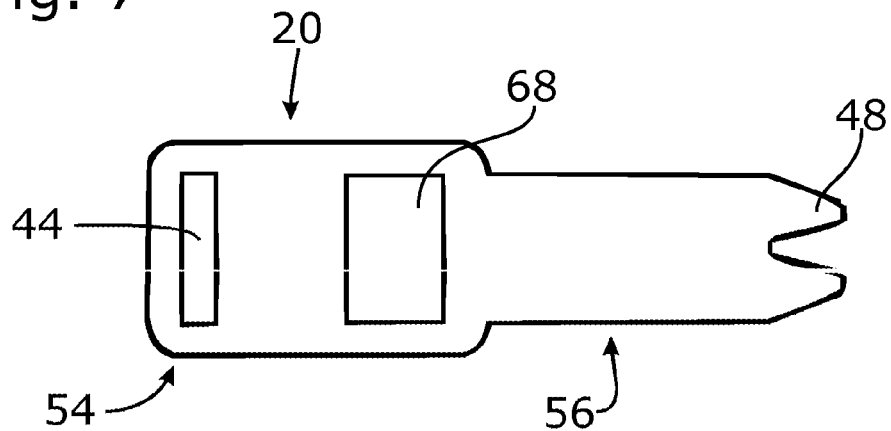
FIG. 7 shows a top view onto a sheet-metal blank for a chain link for a second embodiment.
Figure 8:
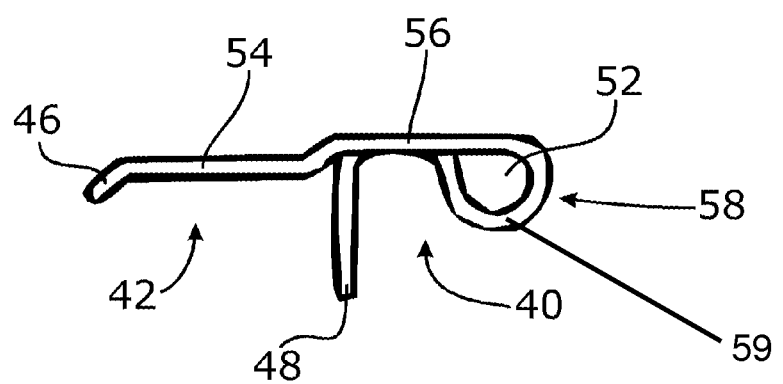
FIG. 8 shows a side view of a chain link for the second embodiment.
Figure 9:
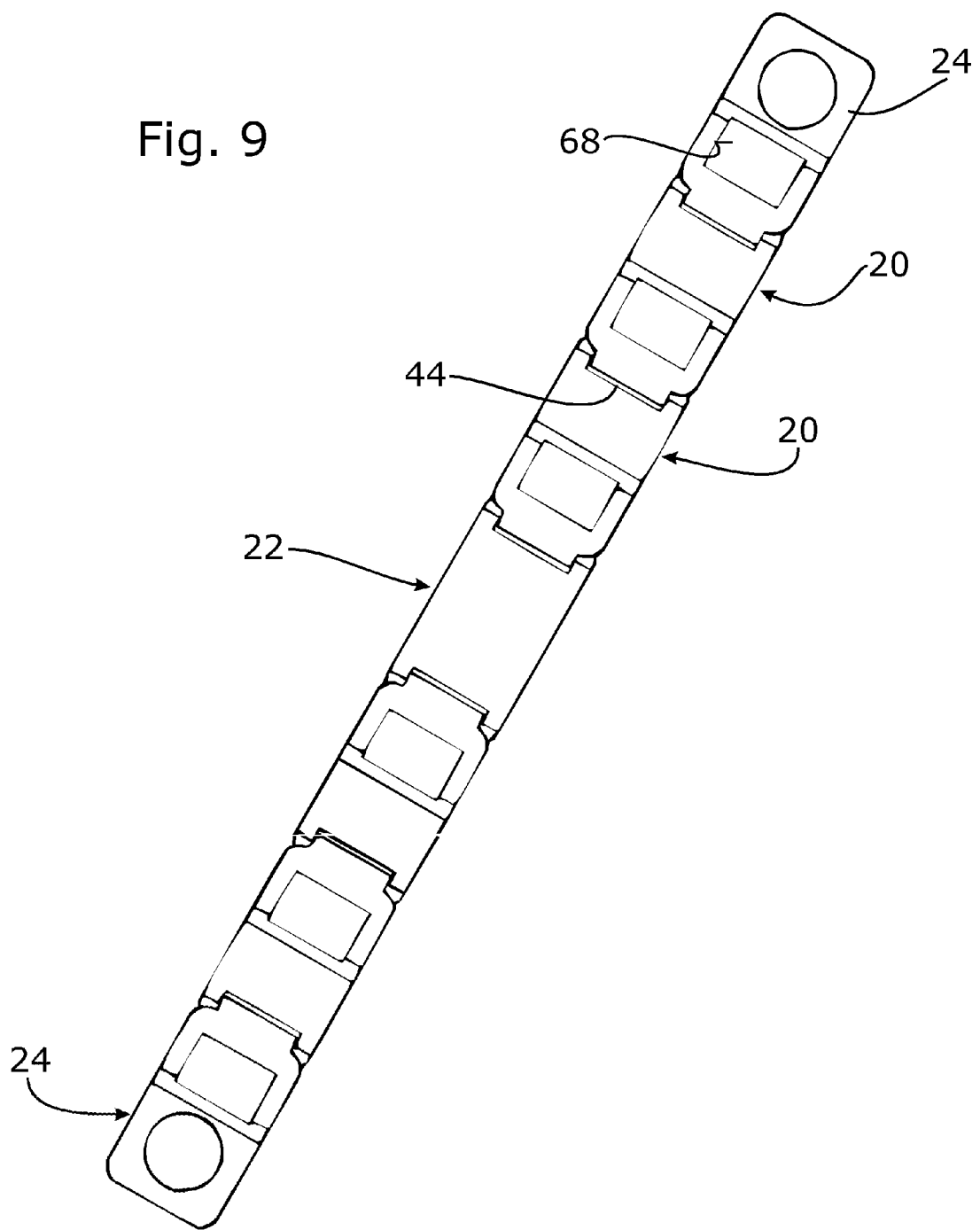
FIG. 9 shows a top view onto a chain.
Figure 10:
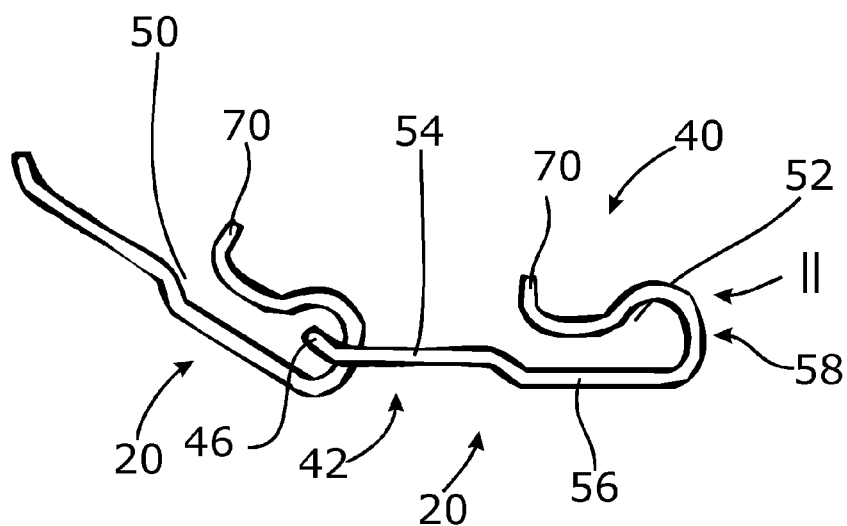
FIG. 10 shows a side view of two chain links hooked into each other of a third exemplary embodiment.
Figure 11:
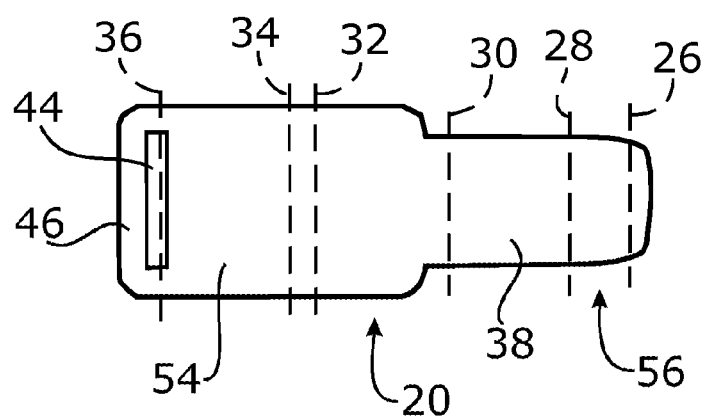
FIG. 11 shows a top view onto a sheet-metal blank for a chain link according to the third exemplary embodiment.
Figure 12:
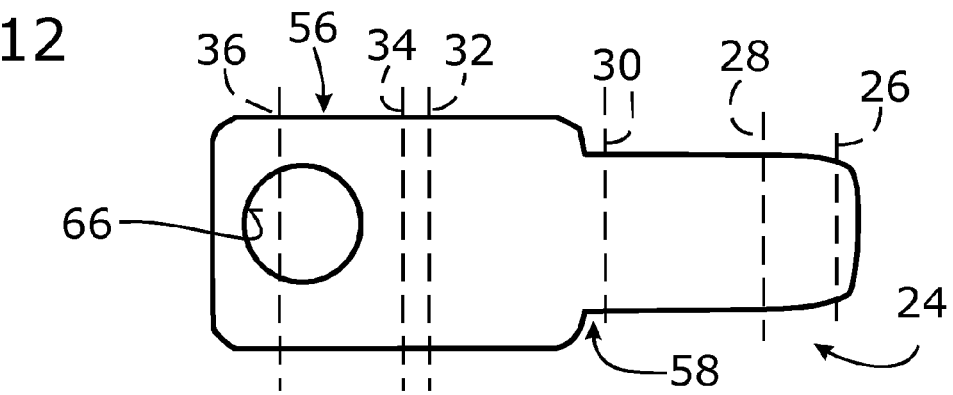
FIG. 12 shows a top view onto a sheet-metal blank for a final link according to the third exemplary embodiment.
Figure 13:
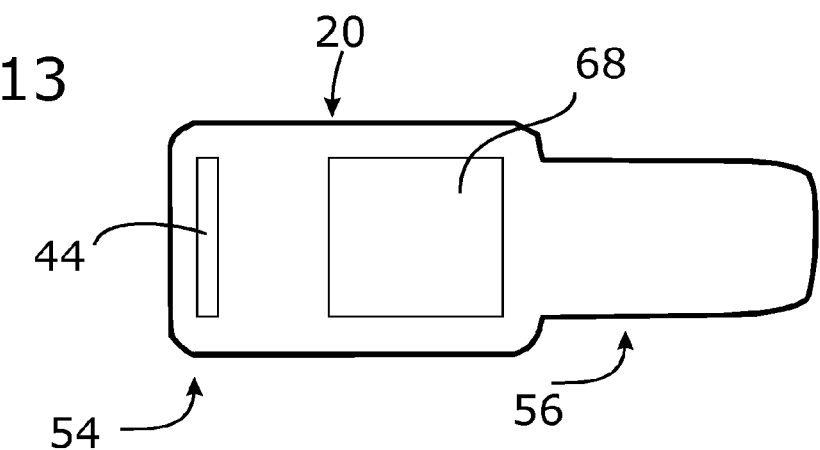
FIG. 13 shows a top view onto a sheet-metal blank for a chain link according to the fourth exemplary embodiment.
Figure 14:
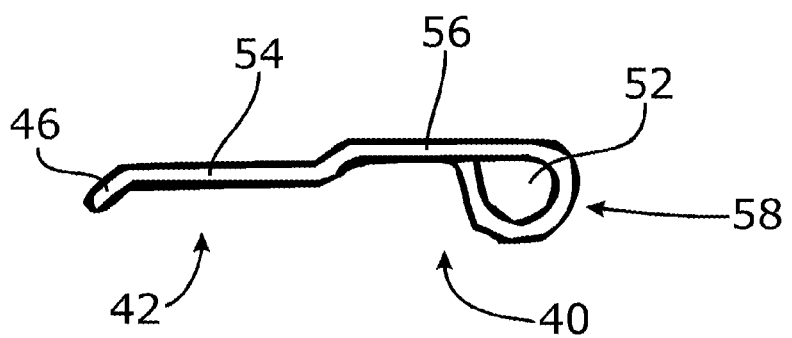
FIG. 14 shows a side view of a chain link for the fourth embodiment.

FIGS. 1 to 6 relate to a first exemplary embodiment; in this case, a simple separation of adjacent chain links is possible without any auxiliary tools. FIGS. 7 and 8 relate to a second embodiment designed such that no separation of adjacent chain links is possible without plastic deformation. FIG. 9 applies to all embodiments. FIGS. 10 to 12 relate to a third embodiment; no teeth are provided. FIGS. 13 and 14 relate to a fourth embodiment, which also does not comprise any teeth. The exemplary embodiments two to four are only described to the extent they differ from the first one.

Figure 3:
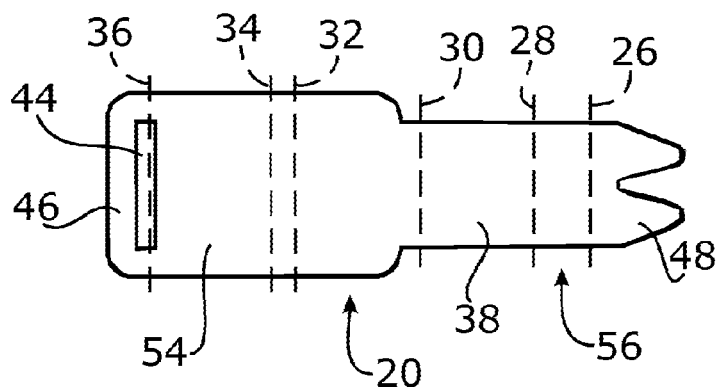
FIG. 3 shows a top view onto a sheet-metal blank for a chain link according to FIG. 1.
Figure 4:
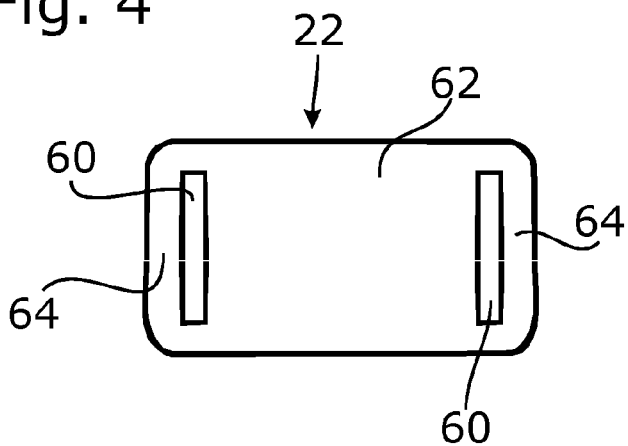
FIG. 4 shows a top view onto a sheet-metal blank for an intermediate link.

The collar according to the first exemplary embodiment comprises normal chain links 20, an intermediate link 22 and two final links 24, all of which are respectively produced from a sheet-metal blank. The normal chain links 20 will be first discussed below. They are produced from a sheet-metal blank as shown in FIG. 3. It is produced from a metal, preferably stainless steel, for example by stamping or cutting; it typically has a material thickness of approximately 1.5 mm. The material is selected such that it practically cannot be bent manually.

Starting with the sheet-metal blank as shown in FIG. 3, several bending operations are carried out about a total of six bending lines 26 to 36; in addition, an area 38 lying between the second bending line 28 and the third bending line 30 is curved.

The chain links 20 each comprise a hook portion 40 and a hook-in portion 42. The fourth and fifth bending lines 32, 34 form the boundary between these two areas 40, 42. Seen in the longitudinal direction of the sheet-metal blank according to FIG. 3, these two areas 40, 42 have a ratio of approximately 2:1. Moreover, they differ with respect to the dimension in the transverse direction, that is, the width. The hook-in portion 42 has a constant width approximately corresponding to its length. The hook portion 40 has two different width dimensions. Over a substantial part of its total length, it has a smaller constant width, which is about ⅔ the size of the width of the hook-in portion 42; towards the hook-in portion 42, it widens in steps near the third bending line 30 to have the width of the hook-in portion 42. The blank according to FIG. 3 is minor-symmetrical about a center line extending parallel to the longitudinal axis. This minor symmetry also applies to all other sheet-metal blanks shown, that is, FIG. 4, FIG. 5 and FIG. 7.

In the hook-in portion 42, a window 44 is provided; it extends transversely to the longitudinal direction of the blank. Its dimensions are selected such that the hook portion 40 fits through the window 44. Whether this happens with more or less clearance is a matter for adjustment. The oversize of the window 44 relative to the cross-sectional dimension of the hook portion 40 can be 5 to 100%.

Figure 2:
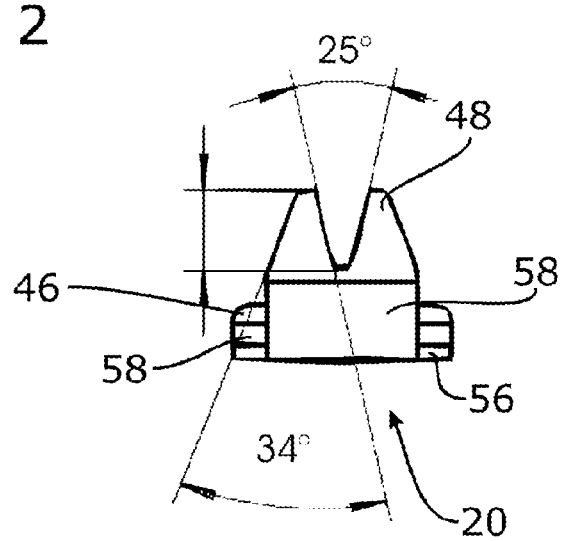
FIG. 2 shows a frontal view of the right chain link according to FIG. 1 in the viewing direction II.

The hook-in portion 42 furthermore comprises an edge portion 46 located between the window 44 and a rear end of the chain link 20. At the opposite end, the sheet-metal blank has a first end portion; there, it has two teeth 48. They are arranged like a W. They lie in the same plane. As FIG. 2 shows, the teeth 48 have a vertex angle of 34°; there is a free angular area of 25° between the two teeth 48. The teeth 48 have a free length of 8 mm. They are rounded off with a rounded portion of about 1.2 mm; preferably, the rounding-off circle has a radius if 0.8 to 2 mm. As can be seen in particular in the blank according to FIG. 3, the tooth 48 is part of the hook portion 40.

During the production of the chain link 20, a number of bending operations are carried out, starting from the flat sheet-metal blank according to FIG. 3, which can be carried out in any order. They are described below in an arbitrary order: The edge portion 46 is bent in an angle of about 30 to 40° about the sixth bending line 36; in this case, bending is done in the mathematically positive direction. The fifth bending line 34 and the fourth bending line 32 are close to each other, the distance is a few millimeters; in this case, a cranking operation, i.e. a parallel offset, is carried out. In the process, bending is carried out in the mathematically negative direction about the fifth bending line 34, and in the mathematically positive direction about the fourth bending line 32. A bending operation of about 90° is carried out about the third bending line 30 in the mathematically positive direction. The area 38 located between the third bending line 30 and the second bending line 28 is now continuously bent in the same direction and then forms a curved front area 58. The second bending line 28 has a bend by about 45° in the mathematically positive direction. A 90° bending operation is also carried out in the mathematically positive direction in the area of the first bending line 26. The final link 24 is also bent in the same way, preferably in the same device.

Figure 1:
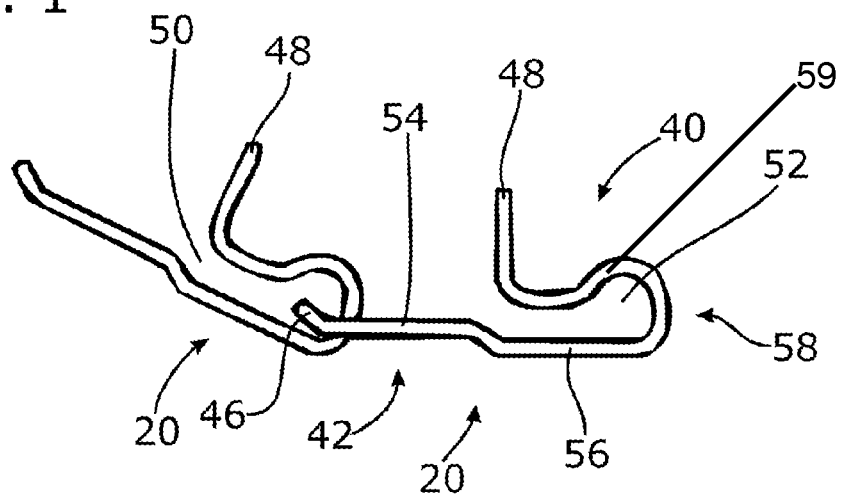
FIG. 1 shows a side view of two chain links hooked into each other.

As is apparent from FIG. 1, the hook portion 40 comprises a free opening 50 which is a part of the inner space 52 of the hook portion 40. This free opening 50 is the narrow section; starting therefrom, the inner space 52 opens into an area of significantly larger cross-sectional dimensions.

In order to separate the two chain links 20 shown in FIG. 1, the right chain link 20 is rotated, first in the counter-clockwise direction, the left chain link is held fast. By further movement to and fro, the hook portion 40 is threaded out of the window 44. In the final step, the window 44 is pulled over the two teeth 48. Correspondingly, assembly is carried out in reverse. The dimensions of the edge portion 46 and the free opening 50 are designed such that the edge portion 46 fits through the free opening 50.

Figure 6:
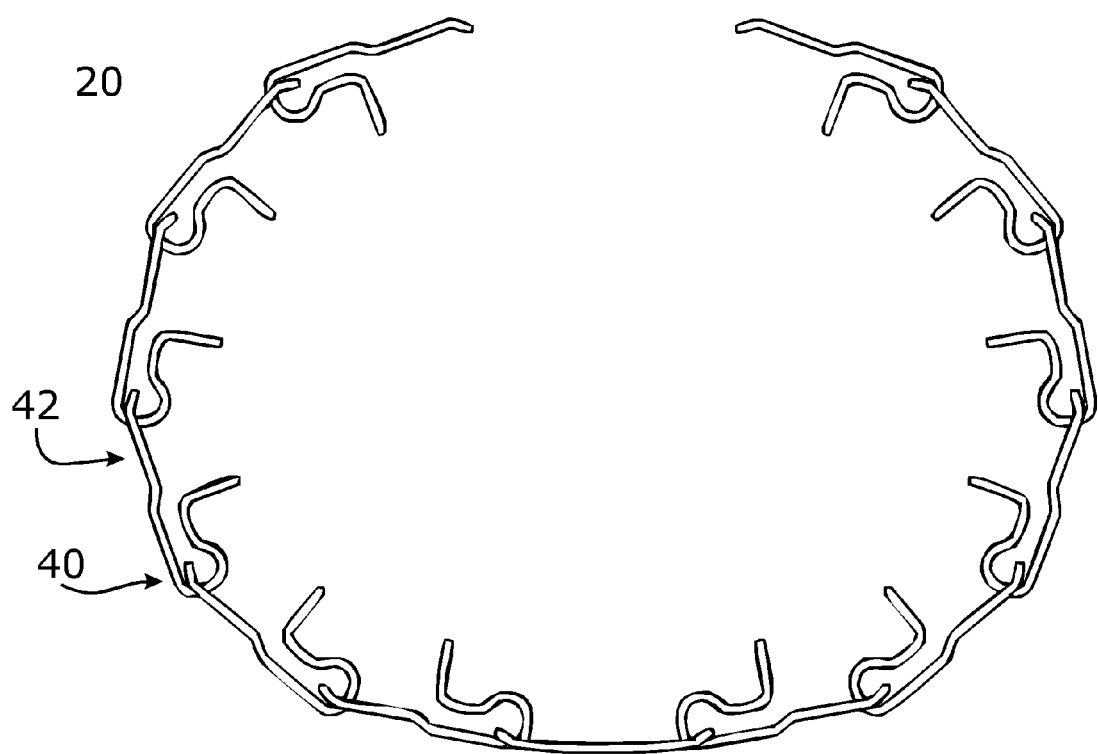
FIG. 6 shows a side view of a collar with chain links as in FIG. 1.

The edge portion 46 is bent about the sixth bending line 36 because the normal shape of the collar is supposed to be a circular shape as it is shown in FIG. 6. The edge portions 46 are kinked in at least about the same angle in which two chain links 20 are angled relative to each other in the normal position, as FIG. 6 shows. The angle is even selected to be slightly greater, for example by 5 to 20° greater than a tangent angle.

The hook-in portion 42 comprises a rear main portion 54, which is plane. It is limited, among other things, by the window 44, the described crank and the lateral edges of the blank. The hook portion 40 comprises a front main portion 56 extending between the third bending line 30 and the fourth bending line 32. It bears the described stepped tapering. In the area of the described crank, the two main portions 54, 56 are parallel-offset by one material thickness of the sheet material used. The teeth 48 are at an angle of about 90° relative to the main portions 54, 56. The hook portion 40 comprises the curved front end portion 58 located between the second bending line 28 and the third bending line 30. As described, the material is continuously curved there. The hook portion 40 further comprises a hook web 59, extending between the curved front end portion 58 and the teeth 48. As shown in FIG. 1, the hook web 59 defines a curved S-shape.

The intermediate link 22 is described below. It comprises two intermediate-link windows 60 which extend parallel to each other and are constructionally identical with the window 44 of every normal chain link 20. A main portion 62 is located between these intermediate-link windows 60. It is plane. It can be configured in any length; the length shown, that is, the distance of the intermediate-link windows 60, is only an exemplary embodiment. An intermediate-link portion 64 is respectively located outside of the intermediate-link window 60; they are also constructionally identical to the edge portion 46 of the chain link 20. They are also bent about a sixth bending line 36 corresponding to the illustration in FIG. 3, with the two intermediate-link portions 64 being bent in different directions, as FIG. 6 shows. No other bends were made.

Figure 5:
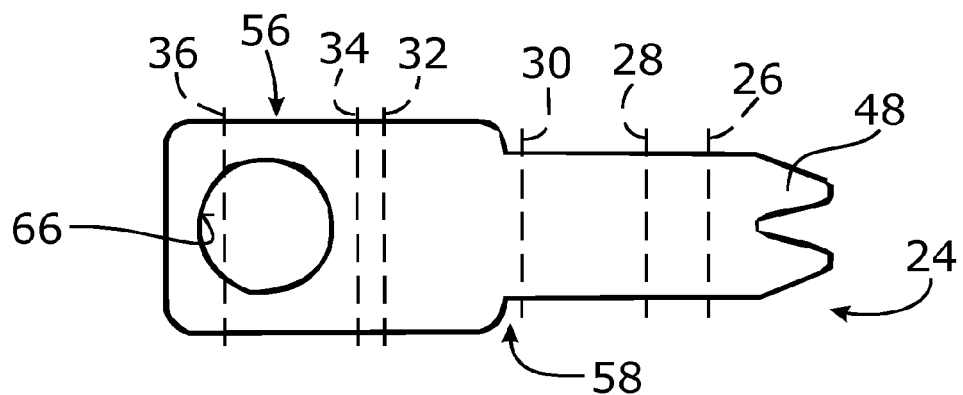
FIG. 5 shows a top view onto a sheet-metal blank for a final link.

A final link 24 is described below. As shown in FIG. 5, its cut largely corresponds to the cut of the normal chain link 20. The external shape is identical. Everything else up to the fifth bending line 34 is also designed and configured identically. Beyond this bending line, there is no window in the final link, but rather a large opening 66; it serves for receiving connection loops or the like, for example of plastic, leather, etc., and for connection with a leash (not shown). In the exemplary embodiment shown, the large opening 66 is circular and has a diameter approximately corresponding to the longitudinal dimension of the window 44. In contrast to the normal chain link 20, the sixth bending line 36 may be omitted. For production reasons, however, it is advantageous to provide it as shown. It should be emphasized that the final links 24 each also comprise teeth 48.

The second exemplary embodiment shall now be discussed below. It differs from the first exemplary embodiment by the free opening 50 now having the value zero, that is, in other words, the inner space 52 of the hook portion 40 being closed on all sides. Special operations are required in order to be able to bring the individual chain links together. It has to be plastically deformed. As FIG. 7 shows, the sheet-metal blank for the normal chain link 20 according to the second embodiment is slightly longer than the sheet-metal blank according to FIG. 3, but otherwise largely identical. The greater length is largely reflected in a greater distance between the second bending line 28 and the third bending line 30. Additionally, the sheet-metal blank according to FIG. 7 has a viewing window 68 formed in the front main portion 56. It has a transverse dimension corresponding to the dimensions of the window 44. In the longitudinal direction, however, it is three times as wide as the window 44. As FIG. 8 shows, the hook web 59 is curved in such a way that it partially lies in the area of the viewing window 68 and fills it. Thus, the finished chain link 20, in the area of the viewing window 68, has a thickness corresponding to a single material thickness.

The viewing window 68 can be omitted. It is sufficient if the hook web 59 is brought into contact with the front main portion 56 or close to it. The free opening 50 is so narrow already in that case that assembly or dismantling is not possible without plastic deformation.

The blanks for the links 20, 22, 24 have the same total width and consist of the same metal-sheet material.

The third exemplary embodiment substantially corresponds to the first exemplary embodiment, but the hook portion in this case does not comprise any teeth. Instead, there is a bent portion 70. This can also be described as follows: the material forming the teeth 48 according to the first embodiment is reduced only to the extent that there is just a bent portion 70 which is at most 20%, in particular 10% as long as a tooth. As the fourth exemplary embodiment will show, such a bent portion 70 can also be dispensed with completely. There is the option of bending the bent portion 70 in another direction, e.g. also in the opposite direction, so that it protrudes into the free opening 50. As FIGS. 11 and 12 show, the blanks are now significantly shorter as compared with FIGS. 3 and 5.

The fourth exemplary embodiment corresponds to the second exemplary embodiment, but again without any teeth. In contrast to the third exemplary embodiment, no bent portion 70 is provided. Thus, the blanks for the individual links end at the first bending line 26. The first bending line 26 is omitted. The blanks thus become even shorter.

The top view onto the chain according to FIG. 9 applies to all four exemplary embodiments. This view shows that it is not recognizable from the outside whether teeth 48 are present or not.

The combination of individual features from the claims and/or the description with each other, thus describing the invention, is reserved.

The invention claimed is:

1. A collar configured to be worn by animals and to connect a leash thereto, comprising:
   a plurality of normal chain links, each normal chain link having a hook portion defining a cross-sectional dimension and a hook-in portion, wherein the hook-in portion comprises a window dimensioned to fit the hook portion therein, such that the window is oversized relative to the cross-sectional dimension of the hook portion by 5 to 100%, and an edge portion defined between the window and a rear end of the hook-in portion coinciding with a rear end of the normal chain link, and the hook portion comprises a curved S-shaped hook web, wherein each normal chain link is produced by bending a piece of sheet-metal blank about bending lines of said piece, each piece of sheet metal blank having a first end portion and an opposing second end portion, wherein the second end portion coincides with the rear end of the hook-in portion and chain link;

a single intermediate chain link produced from a sheet-metal blank having two intermediate-link windows that are separated from each other, constructionally identical to the windows of the hook-in portions and configured to prevent disengagement of said hook portion from the intermediate-link windows through a lateral edge of the intermediate chain link, and adjacent to a respective opposing end of the intermediate link, a main portion extending in a single plane from one of the intermediate-link windows to the other of the intermediate-link windows, and two intermediate-link edge portions each defined between a window and the respective opposing end of the intermediate link adjacent thereto, and two constructionally identical final chain links each produced by bending a piece of sheet-metal blank about bending lines of said piece, wherein each final chain link includes an opening that is sufficiently large and configured to connect an animal leash thereto, and a hook portion comprising a curved S-shaped hook web constructionally identical to each of the S-shaped hook webs of the normal chain links and configured to fit into the window of an adjoining one of the normal chain links or the intermediate chain links.

2. The collar according to claim 1, wherein the hook portion further comprises a free opening dimensioned such that the edge portion fits through the free opening.

3. The collar according to claim 1, wherein the hook portion further comprises a free opening dimensioned such that the edge portion does not fit through the free opening without plastic deformation of the chain link.

4. The collar according to claim 1, wherein the hook-in portion further comprises a rear main portion on the other side of the window opposite to the edge portion, and the edge portion is bent at an angle between about 5° and about 30° relative to the rear main portion about a bending line extending parallel to a longitudinal direction of the window.

5. The collar according to claim 1, wherein the hook-in portion further comprises a rear main portion on the other side of the window opposite to the edge portion, and the edge portion is bent at an angle between about 10° and about 20° relative to the rear main portion about a bending line extending parallel to a longitudinal direction of the window.

6. The collar according to claim 1, wherein several bending lines are provided that extend parallel to a longitudinal direction of the window.

7. The collar according to claim 1, wherein the hook portion further comprises a front main portion and a curved front end portion.

8. The collar according to claim 7, wherein the hook-in portion further comprises a rear main portion lying in a plane, and the front main portion is located between the rear main portion and the curved front end portion and is also located between the rear main portion and the hook web and lies in another plane that is parallel to the plane in which the rear main portion lies and the plane in which the rear main portion lies is offset relative to the plane in which the front main portion lies toward the hook web by a material thickness of the sheet-metal blank.

9. The collar according to claim 7, wherein, in a direction from the curved front end portion toward the first end, the S-shaped hook web first extends away from the front main portion and then extends toward the front main portion.

10. The collar according to claim 1, wherein the hook portion defines an inner space having a front end portion at one end and a free opening at an opposing end thereof, wherein the inner space defines a progressively widening cross-section in a direction from the free opening toward the front end portion.

11. The collar according to claim 1, wherein the hook portion defines an inner space having a front end portion at one end and a free opening at an opposing end thereof and further comprises a front main portion, and wherein the free opening is located between the front main portion and the hook web.

12. The collar according to claim 1, wherein the sheet-metal blank forms two teeth at its first end portion, and the first end portion is dimensioned such that it fits through the window.

13. The collar according to claim 1, wherein the hook portion further comprises a front main portion and a curved front end portion, and the front end portion extends in an angle between about 80° and about 100°, relative to the front main portion.

14. The collar according to claim 13, wherein the front end portion extends at about a right angle relative to the front main portion.

15. The collar according to claim 1, wherein each intermediate-link edge portion is bent at an angle between about 5° and about 30°, relative to the main portion.

16. The collar according to claim 15, wherein the intermediate-link edge portion is bent at an angle between about 10° and about 20° relative to the main portion.

17. The collar according to claim 1, wherein the sheet-metal blank comprises two teeth at a first end portion having a W-shape with rounded-off peaks, and the teeth are part of the hook portion.

18. The collar according to claim 1, wherein the hook portion comprises a front main portion and the hook-in portion comprises a rear main portion, the collar further comprising a boundary portion extending between the front main portion and the rear main portion, the boundary portion bending in a first direction relative to the front main portion toward the hook web and also in a second direction relative to the front main portion that is opposite the first direction.

19. The collar according to claim 1, wherein the plurality of normal chain links includes a first normal chain link and a second normal chain link, the first normal chain link is hooked into one of the two intermediate-link windows of the single intermediate chain link and the second normal chain link is hooked into another of the two intermediate-link windows of the single intermediate chain link, and the edge portion of the first normal chain link and the second normal chain link are oriented in opposite directions from each other.

* * * * *